United States Patent [19]
Bunnell et al.

[11] Patent Number: 6,075,939
[45] Date of Patent: Jun. 13, 2000

[54] TIGHTLY COUPLED, SCALABLE MODULE BASED MICRO-KERNEL OPERATING SYSTEM ARCHITECTURE

[75] Inventors: Mitchell P. Bunnell, Los Gatos; Dorr H. Clark; David I. McCooey, both of Campbell, all of Calif.

[73] Assignee: Lynx Real-Trime Systems, Inc., San Jose

[21] Appl. No.: 08/937,295

[22] Filed: Sep. 27, 1997

[51] Int. Cl.$^7$ .................................................. G06F 9/445
[52] U.S. Cl. ...................... 395/701; 395/702; 395/703; 395/704; 395/705; 395/706; 395/707
[58] Field of Search ................................... 395/701, 702, 395/703

[56] References Cited

U.S. PATENT DOCUMENTS

| | | | |
|---|---|---|---|
| 5,136,590 | 8/1992 | Polstra et al. | 714/29 |
| 5,353,411 | 10/1994 | Nakaosa et al. | 395/651 |
| 5,394,547 | 2/1995 | Correnti et al. | 395/712 |
| 5,584,032 | 12/1996 | Hyatt | 711/100 |
| 5,640,562 | 6/1997 | Wold et al. | 395/652 |
| 5,721,922 | 2/1998 | Dingwell | 709/103 |
| 5,742,825 | 4/1998 | Mathur et al. | 395/680 |
| 5,784,549 | 7/1998 | Reynolds et al. | 395/182.22 |
| 5,815,415 | 9/1998 | Bentley et al. | 364/578 |
| 5,835,764 | 11/1998 | Platt et al. | 709/101 |
| 5,938,743 | 8/1999 | Nahidipour et al. | 710/22 |

OTHER PUBLICATIONS

Jung et al., "Dynamic Code Binding for Scalable Operating System in Distributed Real–Time Systems", IEEE, pp. 96–100, 1995.

Kosai et al., "Application of Virtual Storage to Switching Systems—An Application of CTRON Kernel On a General–Purpose Microprocessor", NTT Electrical Communication Laboratories, IEEE, pp. 0465–0469, 1989.

Zuberi et al., "Emeralds: A Microkernel for Embedded Real–Time Systems", IEEE, pp. 241–249, 1996.

Engler et al., "Exokernel: An Operating System Architecture for Application–Level Resource Management", ACM, pp. 251–266, Dec. 1995.

Inohara et al., "'Unstable Thread' Kernel Interface For Miniming the Overhead of Thread Switching", IEEE, pp. 149–155, 1993.

Liedtke, "On Micro–Kernel Construction", SIGOPS, ACM, pp. 237–250, Dec. 1995.

Keshav, "Proceedings of the conference on Communications Architectures, Protocols and Applications", ACM, pp. 149–157, 1994.

Gheith et al., "CHAOSarc: Kernel Support for Multiweight Objects Invocations, and Atomicity in Real–Time Multiprocessor Application", ACM, pp. 33–72, Feb. 1993.

Oikawa et al., "Scalability in a Real–Time Kernel", IEEE, pp. 35–42, Mar. 1997.

Fowler et al., "Formal Development of a Real–Time Kernel", IEEE, pp. 220–229, 1997.

Lo et al., "Architectural Considerations in the Design of Real–Time Kernels", IEEE, pp. 137–147, 1993.

*Primary Examiner*—Tariq R. Hafiz
*Assistant Examiner*—Ted T. Vo
*Attorney, Agent, or Firm*—Gerald B. Rosenberg; New Tech Law

[57] ABSTRACT

A computer operating system that can be flexibly constructed by inclusion of any of a plurality of processing components. These processing components include (1) a core component that includes a process manager that provides for co-execution of multiple processes, each such process having an associated context; (2) a first processing component that defines a predetermined processing function that is executed within the context of any of a number of multiple processes and that includes a set of import symbols and export functions; and (3) a component switch that is coupled to the core component to provide a tightly coupled connection between the core component and the first processing component such that an execution reference made within a particular context to any of the import symbols and export functions are local within that particular context.

20 Claims, 3 Drawing Sheets

TIGHTLY COUPLED, SCALABLE MODULE BASED MICRO-KERNEL OPERATING SYSTEM ARCHITECTURE

BACKGROUND OF THE INVENTION

1. Field of the Invention

The present invention is generally related to the design and implementation of hard real-time capable operating systems and, in particular, to an operating system design that uses modular components that are tightly coupled to a micro-kernel like core component to establish an operating system.

2. Background of the Invention

The demands on computer systems, including their operating systems, continues to increase. These demands, affecting the expanding variety and complexity of computer system environments, have required operating system to likewise become greatly varied and complex. The level of current operating system complexity has become so substantial that the time required for general purpose operating systems to mature is now stretching into a decade long time-frame. The efforts to retrofit or modernize exiting mature operating systems serves unsurprisingly to retard the maturation process itself.

The desired features of a modern operating system can be readily enumerated: stable, configurable for divergent computing environments, having minimal hardware requirements, low system management needs, high performance, if not providing near to hard real-time performance, low operating system execution overhead, support for third party kernel level software objects, adaptability to specialized computing environment applications, etc. The number of desired features seems to preclude the development of any operating system that is of general applicability over any significant range of computing system scale or purpose.

Currently, the more widely utilized operating system include Unix®, and the various Unix® derivative operating systems, and the Windows® family of operating systems. Other lesser known but widely utilized operating systems are of a scale to effectively support embedded controllers and dedicated function computer systems.

General purpose operating systems are considered to be less than adequately reliable for near and hard real-time applications. Although the Unix® operating systems are relatively mature and stable, their substantial kernel size and generality precludes use in most dedicated computer systems of moderate scale and certainly in small scale embedded system controller applications. That is, the Unix® operating system is regarded generally to be too large and monolithic to permit use in anything less than a large scale computer system. Further, many Unix® API system calls and low level kernel functions are not compatible with the specific execution in performance, resulting in unpredictable response delays in servicing time-critical events. This particular set of variants are therefore not suitable for high-speed computing environments, or situations that require only modest degrees of predicably bounded event response time.

Other modern general purpose operating systems, such as Windows® NT™, implement fully preemptable kernels. Further, these operating systems are, like Unix®, monolithic with large system resource requirements. Consequently, these other operating systems are generally inadequate for meeting expected operating system demands. The remaining relatively proprietary operating systems are largely focused on serving embedded control and dedicated computer operating environments. These operating systems generally provide relatively compact, preemptable kernels. While requiring substantially less system resources, the services obtainable through the operating system are correspondingly limited. The system resources that are provided are again often packaged as part of a monolithic kernel. Further, routine modification of kernel based operating system services typically requires extensive access to and likely modification of the operating system kernel source code. Often, the kernel modifications necessary to support new operating system services results in an increased system performance and resources.

The Windows® CE™ embedded operating system represents an effort to bridge the gap between the large general purpose operating systems and the compact embedded operating systems used at the other extreme of computer system scale. Windows® CE™ in particular is a derivative of other Windows® products re-worked to provide highly selected and generally limited functionality while presenting a highly compact operating system with reduced resource requirements. While well adapted to support small interactive computing appliances, Windows® CE™ has the same limitations as the embedded operating systems, including limited adaptability to third party kernel software.

Many fundamentally different efforts have been made in recent years to develop operating systems that are small, easily extended and efficient in both execution performance and event response times. Once such effort involves the use of a micro-kernel/server operating system architecture. In this design, a micro-kernel provides some basic process control functions. Typically, a multiplicity of servers are relied upon, each executing in their respective kernel threads, to provide specific kernel level functions. One implementation of the micro-kernel based operating system is known as the Mach operating system, and was first developed at Carnegie Mellon University.

While the micro-kernel/server design provides a substantial degree of modularity and extensibility, such operating systems tend to be inefficient in their use of available computing resources and in managing event response capabilities. For example, a conventional micro-kernel/server design communicates by direct messages passed between the micro-kernel and the different then executing servers. Since each server executes in its own kernel thread, each message sent incurs at least two distinct context changes: one by the micro-kernel to forward a message and another by the server to perform the function requested by the message. Although kernel thread context switches are lightweight, all micro-kernel/server intercommunication is performed using messages. Further, blocking kernel functions, needed to maintain the data integrity of certain server functions, introduces unpredictable and unbounded event response latencies. Consequently, the micro-kernel/server operating system design is not well suited for high performance computing environments, particularly including those that require some bounded event response capabilities.

Consequently, there is a clear need for an efficient operating system architecture that is readily scalable, efficient in terms of execution performance and responsiveness events readily re-configurable to accept support for add or modify operating system services provided to application programs.

SUMMARY OF THE INVENTION

Thus, a general purpose of the present invention is to provide an efficient operating system structure that permits scaling from small, embedded systems type operating systems to relatively fully featured, network capable, standards compliant operating systems.

This is achieved in the present invention by providing an operating system, for execution by a computer, that can be flexibly constructed by inclusion of any of a plurality of processing components. These processing components include (1) a core component that includes a process manager that provides for co-execution of multiple processes, each such process having an associated context; (2) a first processing component that defines a predetermined processing function that is executed within the context of any of a number of multiple processes and that includes a set of import symbols and export functions; and (3) a component switch that is coupled to the core component to provide a tightly coupled connection between the core component and the first processing component such that an execution reference made within a particular context to any of the import symbols and export functions are local within that particular context.

An advantage of the present invention is that the micro-kernel like architecture provides for substantial flexibility in functionally defining an operating system.

Another advantage of the present invention is that the kernel plug-in components that are selected for inclusion based on a functionally defined operating system profile are tightly coupled through local references to the kernel core component, resulting in minimal execution overhead as a consequence of the modular form of the present invention.

A further advantage of the present invention is that unification of selected kernel components with the core kernel component provides for default resolution of all symbol and function references not otherwise supported by the selected kernel components. Still another advantage of the present invention is that special purpose kernel components can be developed by users/OEMs and included in an operating system profile without required modification, or source code access, to any other kernel components. A system of both kernel component loading and initialization priorities is defined to enforce a defined relative relationship with respect to the core and other kernel components.

Yet another advantage of the present invention is that kernel components are provided to service sets of API system calls, permitting the supported API to be modified for specific operating system applications. Kernel components, particularly including those developed to serve a specialized purpose, can inclusively redefine and exclusively override existing API system calls, as well as adding new system calls, to support specialized functions and requirements of user/OEM applications, all through a well understood, consistent operating system API model. The execution time overhead incurred in supporting the modifiable API structure is minimized. Also, an initialization time system of assigning system call handles ensures that a consistent, non-conflicting set of API system call identifiers is defined for every selected set of kernel components, including those developed by independent user/OEMs.

Still another advantage of the present invention is that, through selection of kernel plug-in components, operating systems of substantially different function, scale, and specialization can be realized from the operating system structure of the present invention. Very small embedded operating systems, moderate sized operating systems providing concurrent execution support for multiple general and special purpose applications, and large scale, fully featured, standards compliant operating systems capable of supporting multiple users and concurrently executing general and special purpose user applications.

A yet further advantage of the present invention is that, through selection of the included kernel components, the resource requirements of the operating system can be tailored to the available hardware resources available.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein.

DETAILED DESCRIPTION OF THE INVENTION

Operating systems constructed in accordance with the present invention will reflect a distinctive micro-kernel like architecture with tightly coupled kernel components, rather than freely executing kernel servers. Because the construction of operating systems will likely differ significantly in general functional description from others based on the same architecture, the present invention is described below in general terms with exemplary details sufficient to enable a person of ordinary skill in this art to appreciate the many functional variations possible while remaining consistent with the operating system architecture of the present invention.

Overview

Figure 1:
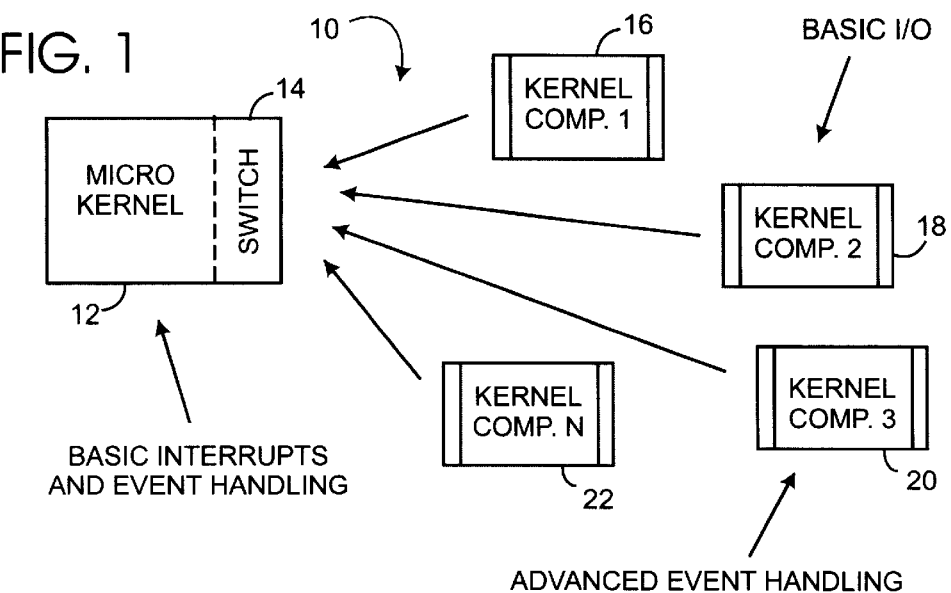
FIG. 1 presents an overview of the operating system structure as defined in accordance with the present invention.

A general representation of the present invention is shown in FIG. 1 as the operating system 10. The micro-kernel like component 12 is an essential kernel component of the operating system 10. This micro-kernel like component 12, which may be variously identified as a kernel core component generically as a micro-kernel, and by general reference as a kernel component, provides certain functionality necessary to support initial boot up and dynamic assembly of the operating system 10. The micro-kernel 12 also includes specific functionality to identify, load, and initialize a profile defined set of kernel components. The micro-kernel 12 includes, generally as an integral part of the micro-kernel 12, a kernel switch 14 that serves to couple kernel components 16–22 to the micro-kernel 12 This kernel switch, or simply the switch, 14 preferably performs two distinct functions. The first function is to provided data structures that can be used by the micro-kernel 12 to tightly couple each of the kernel components 16–22 through the switch 14 to the micro-kernel 12 and the other kernel components 16–22. For purposes of the present invention, tight coupling is defined to mean coupling through symbol and function references that require tens or less additional CPU instruction cycles to logically complete each reference. Preferably, the kernel components 16–22 are provided in a common address space with the micro-kernel 12 and execute within a context in common with the micro-kernel 12. In such preferred cases, a reference generally will incur execution of two additional cycles as needed to bridge a double indirection in the reference call or read.

One or more of the kernel components 16–22 is provided and tightly coupled through the switch 14 to the micro-kernel 12 to form an instance of the operating system 10. Each of the kernel components 16–22, which may also be referred to as kernel plug-ins and kernel plug-in components, will preferably include one or more functionally related kernel objects. These objects are preferably compiled and linked together to form a single kernel component. Other kernel components may support multiple functions, perhaps only loosely related to one another, to provide combination kernel plug-in components. Combination kernel components can conveniently collect a set of kernel component functions commonly used together. The memory resource requirements of the operating system 10 may also be reduced by use of a combination kernel component, though the memory resource savings will likely be small.

The effective scale of the operating system 10 is largely dependent on the scope of kernel component functions provided in a profile selected set of kernel components 16–22. The effective scope of the provided kernel component functions is further determined by the relative mutuality of the kernel component functions to construct a particular feature or function of the operating system 10. For example, the kernel components 16–22 may preferably provide support for a memory management function, a basic data I/O handling function, an event handler, and a timer function, respectively. One operating system function within the scope of the operating system 10, as so defined, is constriction of a simple I/O data queue in system memory and managed by the kernel component 16. I/O data from the kernel component 18 is transferred to system memory in response to an external event detected by the kernel component 20, a counter event supported by the kernel component 22, or an interrupt signal received directly by the micro-kernel 12. The apparent absence of a file system manager kernel component in this example precludes storage of the I/O data in some system data storage resource.

The second function of the switch 14 is to provide an interface to the micro-kernel 12 and the kernel components 16–22 for symbol and function references made by, but not implemented in the micro-kernel 12 or kernel components 16–22. That is, the switch 14 provides default symbol and function return values for otherwise unsupported references. The switch 14 is provided with the symbol and function return values for both the present kernel components 16–22 and any other symbol and return values that might be referenced in the execution of the micro-kernel 12 or any of the kernel components 16–22. The switch 14 therefore selectively provides the default values for references not actively supported by the current selection of kernel components 16–22. Thus, this switch 14 function is complimentary to the tightly coupled reference re-directions implemented by the switch 14 for symbols and functions provided by the kernel components 16–22.

In conventional operating systems, exceptions are generated during execution when a referenced symbol or function cannot be found. These exceptions are precluded by operation of the default reference function of the switch 14. That is, the compiler generally associated with the operating system 10 can generate referenced, non-local function and symbol name lists when compiling any of the kernel components 16–22. The list for each of the kernel components 16–22 are annotated to specify a default return or symbol value for each of the list entries. The default value for any particular name on the list can be readily determined at least by reference to the associated kernel component source code listing.

The annotated definition file is then available for subsequent use. Processing the definition file for a particular kernel component produces corresponding programming language header and source code files. The header and source code files can then be included in the compilation of the kernel component itself. Thus, all possible symbol and function references re-directed to the switch 14 will return with a computed or default return value.

In a preferred embodiment of the present invention, the micro-kernel 12 itself supports a set of relatively basic features appropriate for controlling an operating system 10 boot process and then supporting the continuing execution of the full operating system 10.

Micro-kernel "Included Functions"

1) An initialization routine to establish the proper hardware system state appropriate for the start of the operating system boot process.

2) An initialization and potential run-time routine that performs initial set-up of the memory system and provides a minimal memory management function that can be overridden by later inclusion of a memory management kernel plug-in component.

3) An initialization routine that prepares and loads the kernel plug-in component import and export tables in connection with the preparation of the switch jump table.

4) Several system time support routines including: a system clock initialization and clock interrupt routine; an interface to the hardware time clock; and a routine implementing a system timeout mechanism.

5) An initialization and basic run-time I/O interrupt routine and a basic trap/exeception handling routine.

6) Routine supporting run-time context switching, ready queue management, and other system thread functions.

7) A routine that implements the system side of semaphore handling.

The kernel components 16–22 are each capable of implementing a wide variety of different kernel functions. Preferably, the function of kernel components can be generally categorized as sources of general applicability, services to support specific or special applications, and services to support a full scale configuration of the operating system 10. The following list of kernel functions represents a preferred set of kernel components.

| Kernel Plug-In Components |
|---|
| Optional components: |
|     pipe — supports pipes |
|         supports system call: pipe |
|     lockf — supports file locking |
|         supports system call: lockf |
|     sem_,get— supports logical semaphores |

-continued

Kernel Plug-In Components

```
       supports system calls: sem_cet,
       sem_count, sem_wait, sem_signal,
       sem_nsignal, sem_reset, sem_delete,
       synch_validate, synch_invalidate
smem — supports shared memory
       supports system call: smem_create,
       smem_get, smem_remove
msg — supports messages
       supports system call: msgctl, msgget.
       msgrcv, msgsnd
socket - supports sockets
       supports system call: socket . connect,
       bind, listen, accept, shutdown, send,
       sendto, sendmsg, recv, recvfrom,
       recvmsg, setsockopt, getsockopt,
       getsockname, getpeername, socketpair.
vsem — supports System V semaphores
       supports system calls: semget, semctl,
       semop
shm — supports shared memory
       supports system calls: shmctl, shmget,
       shoat, shmdt
ssynch — supports semaphore synchronization
       supports system calls:
       k_mutex_enter_rel, k_mutex_exit,
       k_cv_wait, k_cv_signal,
       k_cv_broadcast, k_csem_wait,
       k_csem_signal
ada — supports ada
       supports system calls: alsys1, alsys1,
       fast_setprio, prio_resume, st_stopself
pshm — supports POSIX shared memory
       supports system calls: mkshm, shmmap,
       shmunmap
pmsg — supports POSIX messages
       supports system calls: mkmq, mqsend,
       mqreceive, mqsetattr, mqgetattr,
       mqpurge, msgalloc, msgfree, mqputevt,
       mqgetevt
sched — supports custom scheduling and
       custom quantization
       supports system calls: setscheduler,
       getscheduler, setquantum, getquantum
binsem — supports binary semaphores
       supports system calls: mksem,
       bsem_ifpost, bsem_post, bsem_ifwait,
       bsem_wait
memlk — supports memory locking
       supports system calls: memlk, memunlk
arequest — supports asynchronous I/O
       supports system calls: arequest,
       listio, await, acancel
evtimerr — supports event timers
       supports system calls:
       make_event_timer, remove_event_timer
tty — supports the terminal manager
       there are no system calls supported by
       the tty kernel component
printstat
       there are no system calls supported by
       the printstat kernel component
mpool
       there are no system calls supported by
       the mpool kernel component
posix_ipc
       there are no system calls supported by
       the posix_ipc kernel component
Alternate components:

embedded posix — supports kernel functions:
       1) read-only access to the file system
       2) a process model
       3) the dynamic system call facility
       4) user threads
       5) user thread synchronization
       6) user timers
       7) program load
```

-continued

Kernel Plug-In Components

```
       8) memory management
       9) signals
       10) kernel info
posix+ — supports kernel functions:
       1) writeable access to the file system
       2) shared memory
       3) floating point support
       4) resource usage
       5) user debug support
       6) select support
       7) process settings
```

The optional kernel components can be used with the micro-kernel 12 in combinations to realize various small-scale embedded operating systems. Such an operating system can be used in, for example, point-of-sale systems and various types of security systems.

Small to medium-scale operating system implementations can be efficiently constructed utilizing the embedded POSIX kernel component. This component implements a generally balanced set of kernel functions Additional functionality can be added by including any of the optional kernel components. These medium-scale systems are often used in technology areas including voice mail control and management applications, as the control system for moderate performance multi-function copier systems, etc.

Full large-scale operating systems can be created through the inclusion of both the POSIX and POSIX+ kernel components. The resulting functionality is appropriate for controlling general purpose computer systems both for general business use and more computationally intense scientific and engineering applications. Further specific capabilities can be added through the inclusion of any of the optional kernel components.

Fully Stand-Alone Operating System/Applications

In preferred embodiments of the present invention, the operating system 10 can be slightly restructured where only a single application program is to be supported by the operating system 10. The operating system is coupled directly to the application program, eliminating the need for an API system call interface Since only a single user level application is to be executed under the control of the operating system, the entire resources of the operating system can be coupled directly to the application.

Although only a single application program can be supported under this slightly restructured architecture, there is no limitation on the use of the optional and alternate kernel components. Often, as is typical in embedded systems design, the effort is to minimize the size of the operating system and target application program. Consequently, there are few, if any, optional kernel components that provide sufficient functionality to outweigh the need for the truly minimum size embedded operating system and target application.

Regardless of whether additional kernel components are included, the restructuring permits the application program itself to become, in effect, a kernel component, reducing the execution overhead and resource requirements of supporting the API. The main routine of the application program effectively provides the main control loop that is executed by the operating system 10, once initialized.

Figure 2:
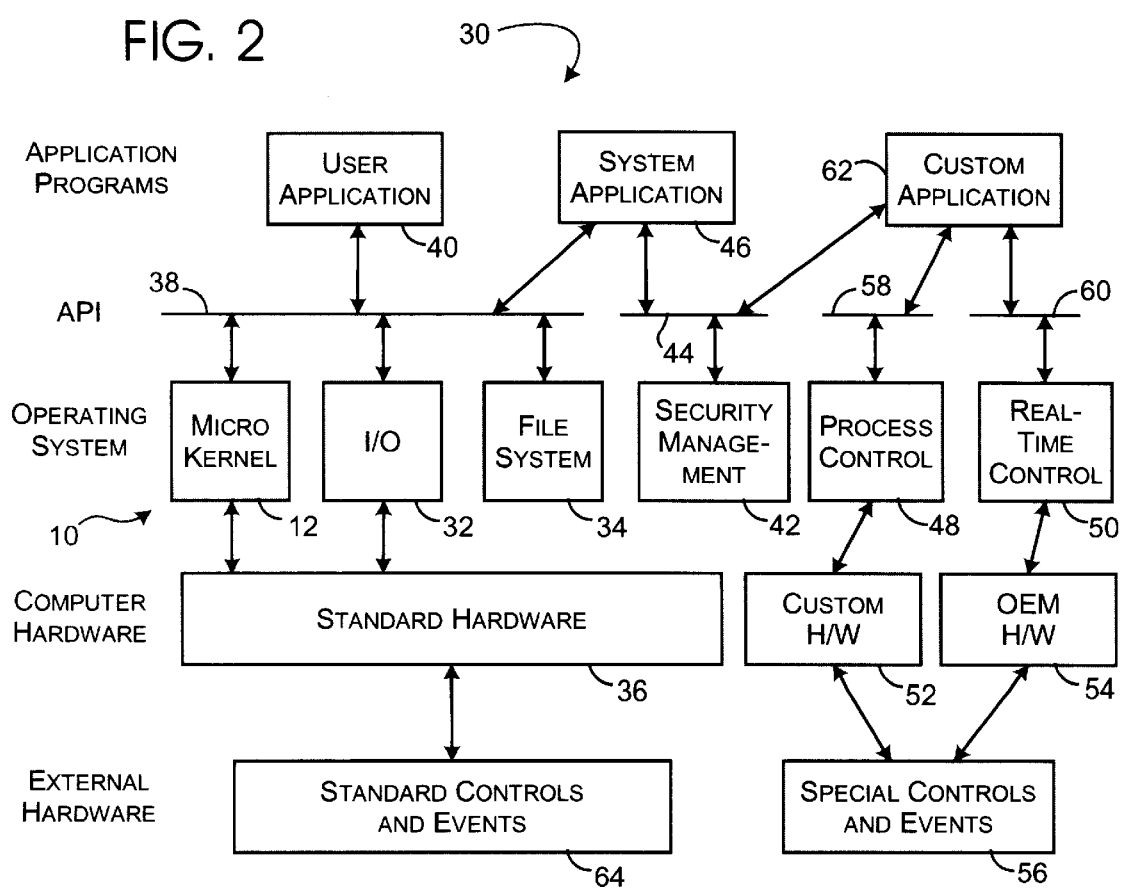
FIG. 2 provides a layered representation of the modular operating system structure of the present invention.

Referring now to FIG. 2, the operating system 10 is shown in the larger context of a substantially complete computer system 30. The micro-kernel 12 is coupled with some number of kernel plug-in components, represented here by an I/O kernel component 32 and a file system kernel plug-in component 34. This portion of the operating system 10 is shown being largely supported by a generally standard computer hardware platform 36 that, in turn, connects to peripheral devices that present standard controls and return events to the standard hardware 64.

The portion of the operating system 10 represented by the micro-kernel 12 and the I/O and file system components 32, 34 combine to support a basic API 38 that is generally capable of supporting a user application 40. This user application 40 represents any number of different applications that are sufficiently supported through the API 38 to perform their intended purposes These user applications 40 may range from low speed event monitoring applications to complex and intensive hard real-time software development environments.

By way of example, a secured management kernel plug-in component 42 is shown as part of the operating system 10. This security management component 42 may implement proprietary encryption algorithms or simple access control and reporting functions. In either event, the proprietary security management component 42 presents an API extension 44 that, in combination with the API 38 serves to support a system monitoring application 46. Whether operating as a background system service or a high priority security monitoring and enforcement program, the system application 46 has full access to at least the portion of the operating system 10 represented by the micro-kernel 12 and kernel components 32, 34, 42.

Process control and real-time control components 48, 50 are presented as included kernel components within the operating system 10. These components 48, 50 are interfaced with custom computer hardware 52 and OEM hardware 54. The custom and OEM hardware may preferably provide control data and receive operating event notifications from peripheral devices represented as the special controls and events block 56.

As an example, a user of the computer system 30 has acquired OEM hardware 50 and real-time control kernel component 50 from a third party vendor of such components and hardware 50, 54. Additionally, the user of the computer system 30 has developed the process control component 48 and custom hardware 52 to provide independent or supplementary functions desired to support proprietary API extensions 58, 60. A custom application 62 may be developed in part by the OEM vendor of the control component 50 and hardware 54. Further development of the custom application 62 to handle some different or larger class of control processes, utilizes the API extension 58 to access the process control component 48.

Similarly, the custom application 62 may further reference the API 38 to obtain standard system services available from the operating system 10 as represented by the kernel components 32, 34.

The computer system 30 shown in FIG. 2 thus further demonstrates that a wide variety of operating system capabilities can be achieved.

Tight Coupling of Kernel Components

Figure 3:
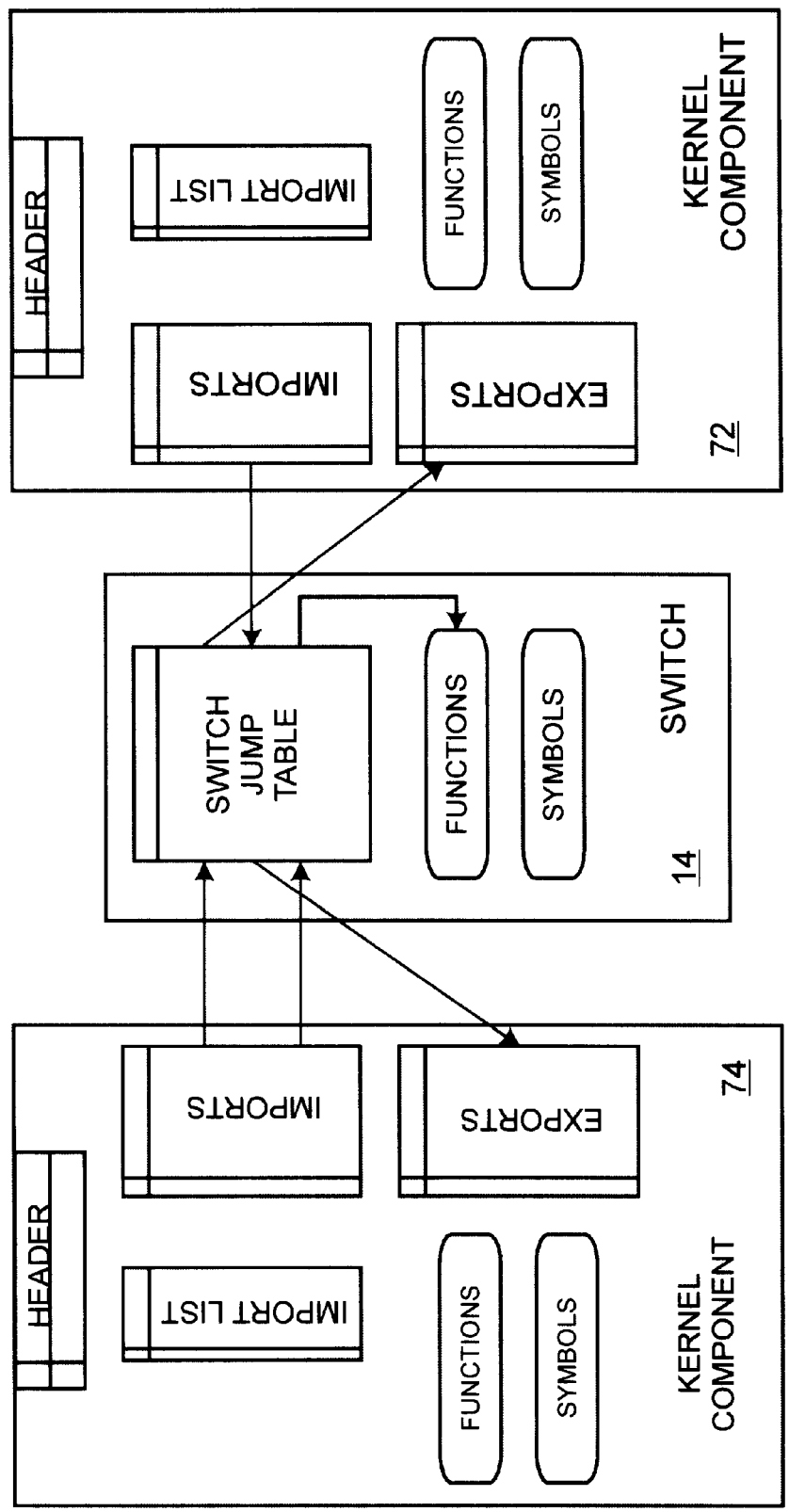
FIG. 3 is a detailed data structure schematic of the micro-kernel like component, including the kernel component switch, and multiple plug-in kernel components.

In FIG. 2, there is no representation of a control path through the operating system 10 that supports the seamless integration of the various kernel components within the operating system 10 as necessary to support even the basic API 38. FIG. 3 provides a detailed view of the control and data structures utilized to tightly couple kernel components through the switch 14 to the micro-kernel 12.

The subset of two kernel components 72, 74 and the switch 14 is shown in FIG. 3. With respect to the mechanisms for tightly coupling kernel components, each kernel component implements a common set of data tables and structures. In addition, the micro-kernel 12 operates as any other kernel component to the other included kernel components of the operating system 10.

Considering now the kernel component 72, a kernel component header 76 is provided at a known location within the kernel component 72, thereby allowing the specific identity and function of the kernel component 72 to be identified in connection with the loading of the kernel component 72 for inclusion in the operating system 10. The header 76 also includes three pointers that locate and import list 80, and imports table 84 and an exports table 96 within the kernel component 72. These pointer offsets may be different as between the different kernel components 72, 74 and the micro-kernel 12.

The import list 80 contains the function call and symbol names that are not otherwise defined in the kernel component 72. The import list 80 thereby lists the identity of all the function calls and symbols that are internally referenced in the kernel component 72 and presumed to exist elsewhere wherein the operating system 10.

The imports list 84 provides pointer storage space with a one-to-one correspondence with the entries in the import list 80. The imports table 84 is filled with pointer addresses that indirectly point to the kernel functions and symbols identified in the import list 80. The kernel component 72 includes internal functions 88 and symbols 92. Designated global functions within the set of functions 88 and global symbols within the set of symbols 92 are identified in an exports table 96. The global function and symbol names and pointers to the corresponding functions 88 and symbols 92 are stored in the exports table 96.

The switch 14 is provided with a switch jump table 100, a set of global default functions 102, and a set of global default symbols 104. With the initialization of the switch 14, the switch jump table 100 is filled with pointer values that reference each row of the exports tables 96, 98 by following the individual pointer stored in the switch jump table 100, the names of all of the exported functions and symbols within the operating system 100 can be found from the switch jump table 100.

The imports tables 84, 86 can then be fully finalized. An incremental scan of an import list 80 can locate any corresponding function or symbol name present in any of the export lists 96, 98. This search for global function and symbol names results in an identification of address locations within the switch jump table 100 that store the pointer address to a corresponding export table 96, 98 that stores the function or symbol address that corresponds to an entry in the import list 80. The found address within the switch jump table 100 is then stored as a [prior] value in the imports table 84 in one-to-one correspondence with the named function or symbol in the import list 80.

The switch jump table 100 can thus be seen as providing a central location that supports double indirect function and symbol references that allow any kernel component 72 to locate any function or symbol listed in the import list 80 that is supported by another kernel component 74 and visible from the exports table 98. The switch 14 thereby provides a low overhead mechanism for dynamically establishing relationships between global functions and symbols and the kernel components that reference them. The mechanism implemented in connection with the switch jump table 100 adds little real processing overhead in the execution of the operating system 10. Nominally, linked objects within a conventional operating system typically uses a single instruction execution cycle to reference an ordinary imported global function or symbol. Use of the switch 14 incurs the additional overhead of two additional instruction execution cycles for each reference of a global function or symbol. Thus, the additional processing overhead is minimal and further depreciated on the basis that global references occur much less frequently than immediate local references.

In resolution of the import requirements of the various kernel components 72, 74, the set of exported functions and symbol names may not provide one or more of the functions and symbols identified by a corresponding import list. As a consequence, the import list carries, in a preferred embodiment of the present invention, implicit representation of the default value to be assigned for any specific entry in an import list not satisfied by the available exported functions and symbols. This implied default value and potentially the function or symbol reference type is used to fill a switch jump table entry with a pointer referencing a correctly valued default function or symbol 102, 104 maintained within the switch 14 itself.

Dynamic System Call Management

A strength of the present invention is the ability to easily configure kernel components in or out or out of the operating system 10. Further, any kernel component is essentially free to implement and support any number of API system calls. There are well known system call numbers and kernel components can readily avoid their use. The possibility of conflicting API system call assignments arises when multiple independently developed kernel components are included in the operating system 10.

Figure 4:
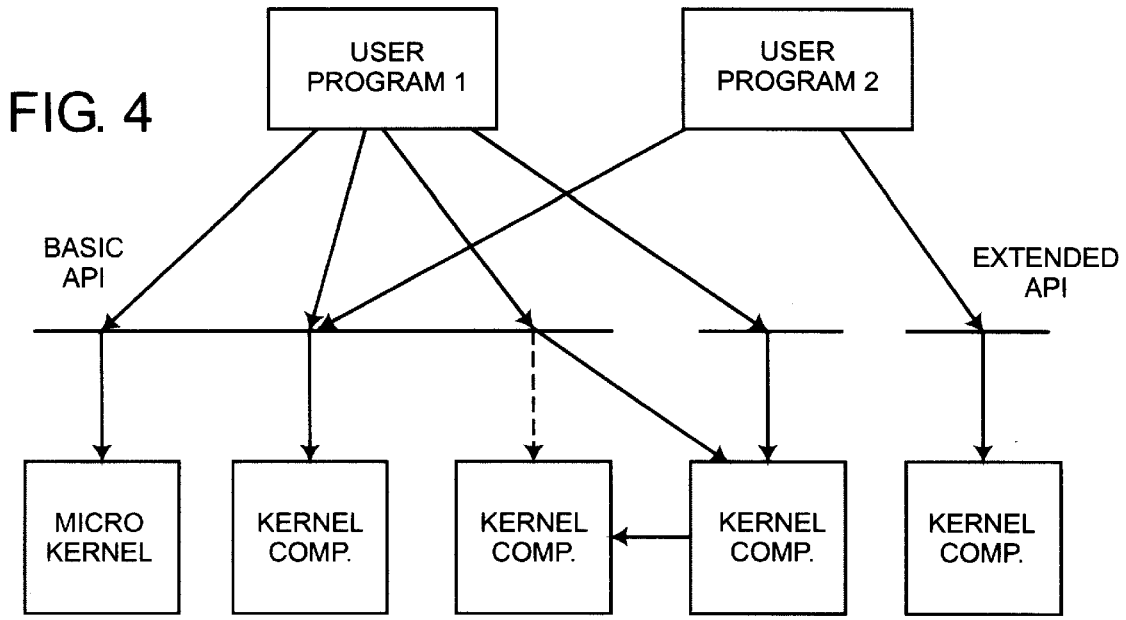
FIG. 4 provides an API call transition diagram illustrating the interaction of user programs with multiple kernel plug-in components.

The present invention provides an API based system for assigning system call numbers to all kernel components that implement API systems calls above the range of well known system call numbers. As generally shown in FIG. 4, multiple kernel components 116, 120 provide support for their own extended API 118, 122 system calls.

Dynamic system call management is implemented by some kernel component, such as component 112, that establishes an API system call within the range of well known system calls (and this range need be defined only with respect to operating systems 10 that implement the present invention). The kernel component also provides an exported "registration" function that can be call through the switch 14 by other kernel components, such as components 116, 120.

Preferably, on initialization of the kernel components 116, 120, or some later defined time in the operating system boot process, these components will call the registration function, presenting a unique API system call name and receiving back a unique API system call number. This returned number can then be used by the kernel component 166 to create an API system call point that specifically uses the number assigned by the kernel component 112.

Subsequently, application programs 124, 126 can call the well known API system call entry point of the kernel component 112. This call is made with a name argument, the same name used by the kernel component 116, to retrieve the previously assigned API system call number now used by the kernel component 116.

Similarly, the kernel component 120 can register with the component 112, based on a unique name, to obtain a unique API system call number, and create the desired API system call point. The user application 126, can determine the API system call number assigned to the kernel component 120 by presenting the same name to the kernel component 112 and receiving back the API system call number being used by the kernel component 120.

The dynamic system call management capability of the present invention thus has the following features:

1) Any system call can be present or absent depending on the current profile set of kernel components included in the operating system 10 at any given time.
2) System calls are dynamically initialized during the boot process, or even later if desired.
3) The dynamic system call management capability does not interfere with use of existing user programs that rely on only the well known system call numbers.
4) Users/OEMs can freely define their own API system calls without concern for conflicts in any given operating system configuration.
5) The number of dynamically assignable system calls supported by the operating system 10 can be defined as a configurable or dynamically programmable parameter of the kernel component 112.

The Operating System Boot Process

Figure 5:
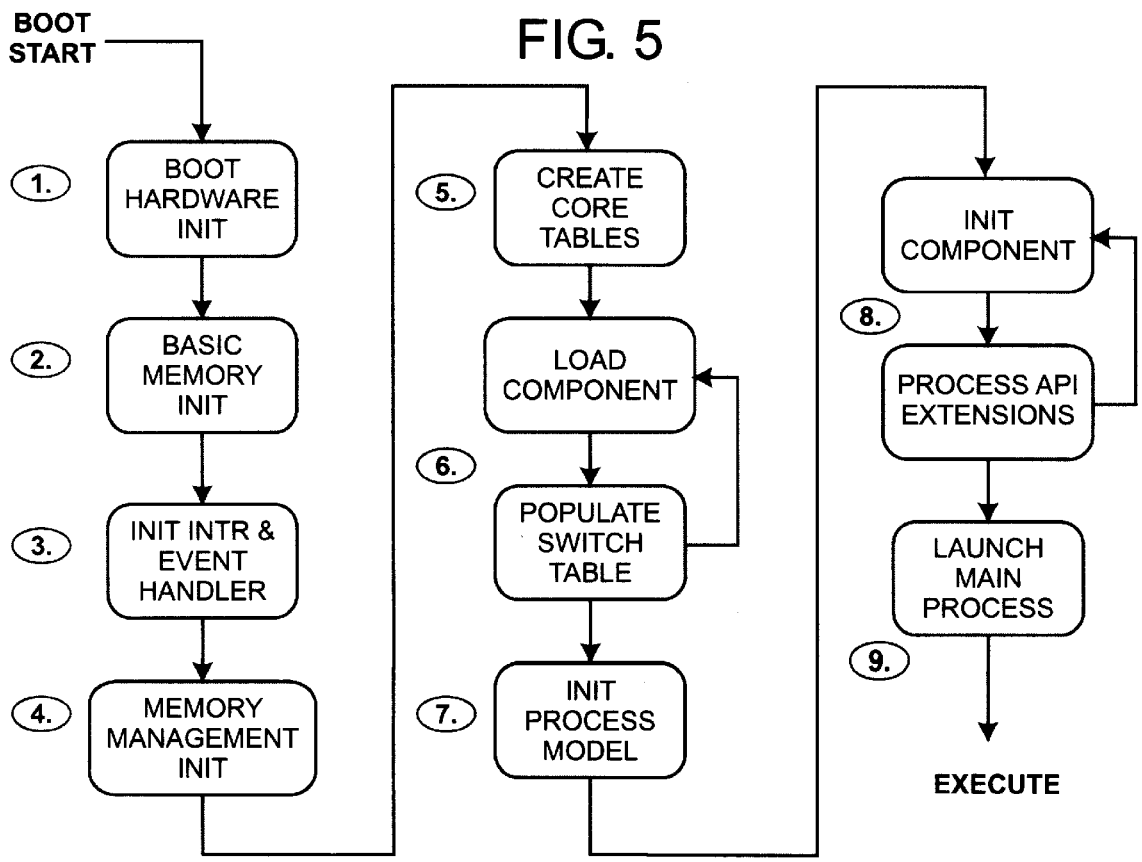
FIG. 5 presents a flow diagram illustrating the boot-time initialization of a modular operating system constructed in accordance with the present invention.

A modularized boot process is used by present invention to initialize, configure and establish the general execution state of the operating system 10. As shown in FIG. 5, the boot process 130 provides for a well ordered and selective initialization of those parts of the operating system actually present under the current profile. No attempt is made to initialize any kernel component that is not present.

The operating system 10 boot process can be generally described as a sequence of 6 primary steps. The order and substance of each step of the boot process is described as follows:

Step One

The boot related system hardware is first initialized 132 to a known good state. A minimal memory management system is then established 134 for the short term use of system memory.

Step Two

The available interrupt and event control hardware is configured and established 136 for initial use.

The switch 14 is also now loaded into system memory and some initialization is performed. Specifically, the switch 14 executes to create a global list from all the imports and exports function and symbol names from all operating system included kernel components (including the microKernel).

If there is a match between import and export names, the import is resolved through the Switch Jump Table. If there is no export name available, the import name is resolved to a default function or variable (as appropriate) generally within the switch 14. If there is an export name and no matching import name, the export is merely added to the Switch Jump Table. All available kernel components are processed in this way, so that all possible imports names are resolved.

Thus, centric function of the switch 14 with respect to the individual kernel components is established.

Step Three

A more extensive memory initialization process is executed 138 to establish the scope of available system memory and to establish memory management over system memory.

Step Four

First, core data structures and control tables are created 140, including a Dynamic System Call Table used to record API entry and handler data, a Switch Jump Table that acts and the center point in establishing tightly coupled connections among the various components of the Operating System 10 and the Process Model structures necessary for the coordinated operation of the Operating System 10. The individual address entries in the Dynamic System Call Table are set to "nosys," returning ENOSYS, to ensure that an error is thrown if the corresponding API system call point is invoked prematurely.

Next, the kernel components specified under the current profile are loaded 142 (in loading priority order as determined by value stored in connection with the kernel component header 76) and initialized into the control structure managed by the switch 14, such as recording the base offset of the kernel component header to locate the kernel component within the operating system 10 and the individual kernel component initialization routines within the loaded kernel components.

Finally, the process model structures previously created are now populated 146 and the process model is set ready for use.

Step Five

A do_inits( ) local function is called by the boot process controller of the operating system 10, specifically the microkernel 12, to walk the linked list of kernel components previously loaded and, in initialization priority order, sequentially execute the initialization routines 148 of the kernel components.

Each initialization routine is customized to fit the needs of the individual kernel component. As each kernel component initialization routine is executed, any system calls supplied by the component are installed into the Dynamic System Call Table.

Step Six

Launch process one as the boot process turns into the null process (process zero). In the preferred embodiment, this eventually leads to execution of the well known UNIX scripts rc rc.network, etc.

SUMMARY

Thus, an operating system architecture that supports, among other features, a high degree of reconfigurability, from very small-scale systems to large-scale general purpose systems, without incurring any significant increase in processing overhead has been described. While the present invention has been described particularly with reference to the Unix operating system, the present invention is equally applicable to other embedded and general purpose computer systems.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

We claim:

1. An operating system, executable by a computer, that can be flexibly constructed by inclusion of a plurality of processing components, said operating system comprising:
   a. a core component including a process manager supporting the co-execution of multiple processes, each such process having an associated context;
   b. a first processing component that defines a predetermined processing function that is executed within the context of any of said multiple processes, said first processing component including a set of import symbols and export functions that are supported by said first processing component; and
   c. a component switch, coupled to said core component, that provides a tightly coupled connection between said core component and said first processing component such that an execution reference made within a predetermined context to any of said import symbols and export functions through said component switch are local within said predetermined context.

2. The operating system of claim 1 wherein sold component switch further includes a default interface for said first processing component, said default interface including default values for said set of import symbols and export functions of said first processing component, said component switch providing for said first processing component to override said default values when a tightly coupled connection is provided between said first processing component and said core component.

3. The operating system of claim 2 wherein said default interface further supports a plurality of processing components by providing default values for said import symbols and export functions of said plurality, wherein a subset of said plurality can be absented from said operating system, and wherein an execution fault condition is avoided following from execution references made to said import symbols and export functions of said subset.

4. The operating system of claim 3 wherein selective absenting of processing components from said plurality provides for the scaling of the available capabilities of said operating system, whereby said operating system can be variously configured to operate as a small embedded operating system and as a large scale, standards compliant operating system.

5. The operating system of claim 1 wherein said core component includes a plurality of export functions, wherein the export functions of said core component and said first processing component are identified by export symbols, wherein said set of import symbols identify a corresponding set of kernel function calls issuable in the execution of said first component, and wherein said component switch includes a data table supporting execution time call redirection of said kernel function calls to export functions determined by a correspondence between respective import and export symbols.

6. The operating system of claim 5 comprising a plurality of components, including said core component and said first component, that include kernel function calls and export functions, wherein said component switch includes a default export symbol table storing a plurality of export symbols and a corresponding plurality of default implementations of export functions, and wherein said switch table provides for the execution time call redirection of said kernel function calls to corresponding ones of said plurality of default implementations where import symbols of said plurality of components is otherwise unmatched by an export function provided by said plurality of components.

7. The operating system of claim 6 wherein said switch table provides for the storage of default data for return in response to kernel function calls to any of said default implementations.

8. The operating system of claim 7 wherein default data storable by said switch table is determined from said import symbols provided within said plurality of components.

9. An operating system, executable by a computer, comprising:
   a. a plurality of kernel function components wherein said kernel function components have respective function request routines and predetermined function call entry points identifiable by determinable symbol references; and
   b. a switch table that stores function call entry point symbol references; and
   c. a function call resolver that establishes within said switch table a correspondence between said respective function request routines and said determinable symbol references, said function call resolver further providing said switch table with default data for non-determinable symbol references.

10. The operating system of claim 9 wherein said respective function request routines are identified by import symbols, wherein said predetermined function call entry points are identifiable by predetermined export symbol, and wherein said function call resolver establishes said correspondence between matching import and export symbols and provides said default data for unmatched import symbols.

11. The operating system of claim 10 wherein said plurality of kernel function components includes a core component and wherein said core component determines the remaining components of said plurality of kernel function components.

12. The operating system of claim 11 wherein said plurality of kernel function components are loadable into a memory of said computer for execution, wherein said core component directs the loading of the remaining components of said plurality of kernel function components, and wherein said core component controls the execution of said function call resolver so that said plurality of core components are tightly coupled together through said switch table when present in said memory.

13. The operating system of claim 12 wherein said function call resolver provides for the establishment of a redirection table through which matching import and export symbol corresponding function calls and function call entry points are connected.

14. The operating system of claim 13 wherein said switch table includes a plurality of default function call entry points and associated default return data, wherein said import functions provide said function call resolver with said default return data, and wherein said function call resolver associates instances of said default function call entry points with said import function calls where corresponding non-default function call entry points are unavailable from said plurality of kernel function components.

15. A modular operating system executable by a computer operating within an event driven environment and supporting hard real-time responsiveness to environment events, said modular operating system comprising:

a. a switch table implementing a function call redirection jump table;
  b. a first kernel component Implementing an event selectable data input/output software control function and including an export symbol corresponding to said event selectable data input/output software control function;
  c. a second kernel component implementing an event responsive interrupt software control function and including an import symbol corresponding to said event responsive interrupt software control function; and
  d. a predetermined kernel component implementing an initialization software function that evaluates said import and export symbols and correspondingly populates said switch table to establish a tight coupling between said event responsive interrupt software control function and said event selectable data input/output software control function with respect to a predetermined event.

16. The modular operating system of claim 15 wherein said second kernel component implements said initialization software function.

17. The modular operating system of claim 15 or 16 wherein said predetermined kernel component includes a list identifying a plurality of kernel components and wherein said initialization software function evaluates the import and export symbols present in said plurality of kernel components to correspondingly populate said switch table.

18. The modular operating system of claim 17 further comprising a predetermined list of export symbols and a corresponding plurality of default software control functions, said initialization software function including said predetermined list in the evaluation of said import and export symbols so that the population of said switch table establishes a correspondence between each of the existing import symbols and at least a corresponding one of said predetermined list of export symbols, whereby each software control function call has at least a default implementation.

19. The modular operating system of claim 18 said list provides an ordered identification of said plurality of kernel components and wherein said initialization software function loads subsequent export symbol references over earlier export symbol references in populating said switch table.

20. The modular operating system of claim 19 wherein said computer includes a non-volatile storage resource that stores said first, second, predetermined, and plurality of kernel components, wherein said predetermined kernel component controls the successive loading of kernel components into the computer memory.

* * * * *